A. M. SUTHER.
CLUTCH.
APPLICATION FILED MAR. 2, 1916.

1,254,863.

Patented Jan. 29, 1918.

WITNESSES:

INVENTOR
Alfred M. Suther
BY
Kiddle & Morgan
HIS ATTORNEYS

UNITED STATES PATENT OFFICE.

ALFRED M. SUTHER, OF ALLENTOWN, PENNSYLVANIA, ASSIGNOR TO SCHAUM & UHLINGER, INCORPORATED, OF PHILADELPHIA, PENNSYLVANIA, A CORPORATION OF PENNSYLVANIA.

CLUTCH.

1,254,863.  Specification of Letters Patent.  Patented Jan. 29, 1918.

Application filed March 2, 1916. Serial No. 81,572.

*To all whom it may concern:*

Be it known that I, ALFRED M. SUTHER, a citizen of the United States, and a resident of Allentown, county of Lehigh, and State of Pennsylvania, have invented new and useful Improvements in Clutches, of which the following is a specification.

The invention relates to friction clutches and the object of the invention is to provide a construction in which there is a quick release between the driving and driven parts of the clutch when the motor that operates the driving part of the clutch is shut down. This quick release is obtained by the contact of balls or rollers that press against sloping surfaces so that there is only a point or line contact whereby the member having these sloping surfaces can be readily moved relative to the balls or rollers, the balls or rollers and the member just referred to constituting a part of the mechanism that serves to force the driving and driven members of the clutch toward each other.

As showing certain specific embodiments of the invention reference is made to the drawings forming a part of this specification, in which drawings—

Figure 1:
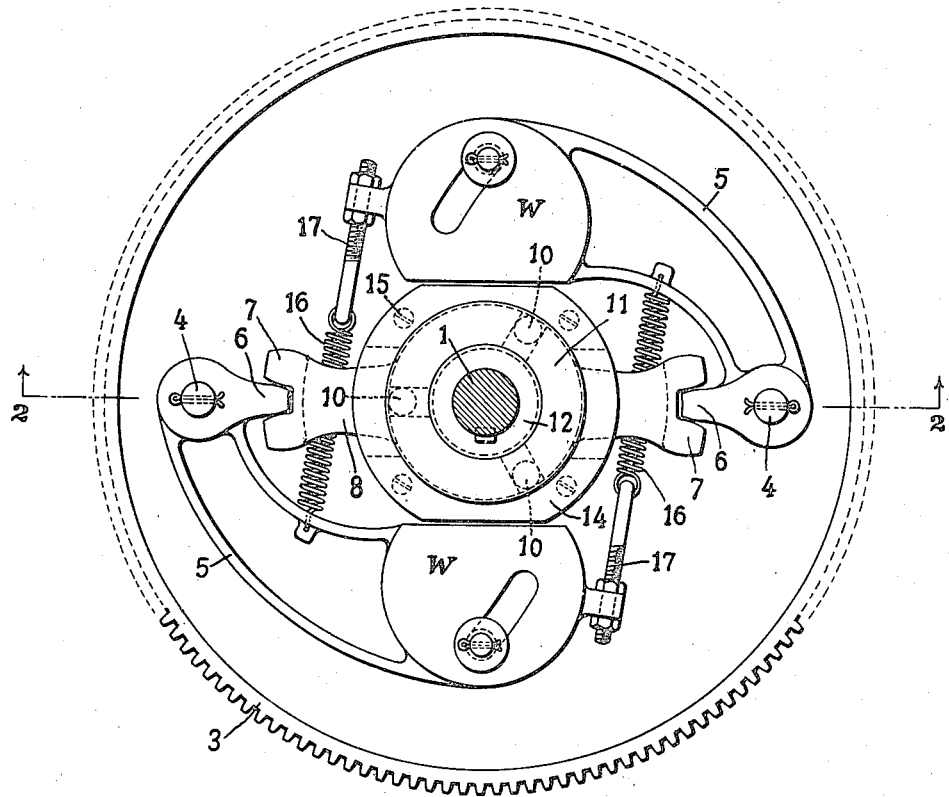
Figure 2:
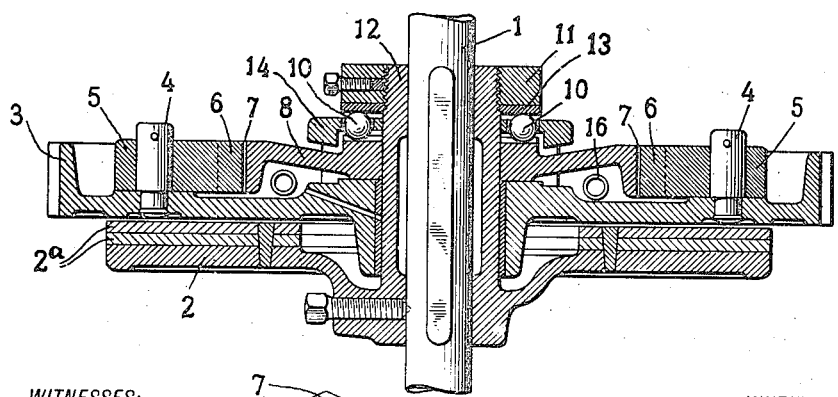
Figure 3:
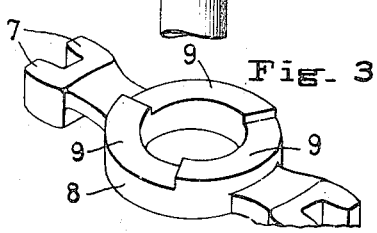

Figures 1 and 2 show respectively end and vertical sectional views of a clutch, Fig. 2 being a sectional view taken as on the plane indicated by the line 2—2 of Fig. 1 looking in the direction of the arrows and Fig. 3 is a perspective view partially broken away showing a member having inclined or sloping surfaces thereon with which surfaces the balls or rollers engage.

In the clutch construction shown the main shaft is designated by the reference character 1 and to this there is secured the driven member 2 of a friction clutch. This driven member is in the form of a disk and is secured to the shaft 1 so that the two will rotate together. The driven member 2 is also provided with wearing members as 2ª which may be made of wood, leather or any other suitable material as desired. The clutch driving member is designated by the reference character 3 and it is mounted so that it rotates about the shaft 1. In the construction shown in Figs. 1 to 3 said clutch driving member is mounted directly upon the hub 12 of the driven member 2. This clutch driving member 3 carries or has pivotally mounted thereupon, as at 4, arms 5 at the free ends of which the weights W are located. Each of these arms has integral therewith a toothed member 6 which engages the teeth 7 that are on the annular member 8 which is shown in full in Fig. 3. This annular member 8 has inclined or sloping surfaces 9 engaged by balls or rollers 10. These sloping surfaces may be referred to as cam surfaces and the member 8 may also be referred to as a cam member since the function thereof is to operate as a cam or wedge between the balls or rollers which are located on one side and the member 3 which is engaged thereby on the opposite side thereof.

It will also be seen that the balls or rollers 10 engage a resisting member 11. This member is secured or fixed to the main shaft 1 as by being secured directly thereto or by being secured as shown in Fig. 1 to the hub 12 of the disk or driven member 2. Upon this hub 12 there is carried the annular member 8 as will be manifest from an inspection of Fig. 2. This annular member surrounds the shaft 1 and may be considered as mounted upon the shaft relative to which the annular member is angularly movable. This resisting member 11 may be provided on its face with a bearing ring 13 which is the part thereof that is directly engaged by the balls or rollers 10; the member 11 therefore is fixed relatively to the driven member 2. A ball or roller spacing ring 14 is secured to the body of the clutch driving member 3 as by means of screws 15. The function of this spacing ring is to maintain the balls or rollers in a certain position relative to the clutch driving member 3 whereby when the cam member 8 is moved relatively to the balls or rollers as a set, or what is the same thing relatively to the driving member, the distance between the resisting member which is engaged by the balls or rollers and the clutch driving member 3 which is engaged by the cam member will be allowed to change. It will therefore be observed that the driving member 3 is located between the driven member 2 and the resisting member 11 and that the closing and releasing mechanism which comprises the cam member 8 and balls or rollers 10 is located between the driving member 3 and the resisting member 11. The weighted arms 5 are connected together by means of springs 16 the tension of which springs can be adjusted by adjusting screws 17. When the clutch driving member 3 is not being rotated the weighted ends of the arms are drawn toward each other thus holding the cam member in such a manner that the clutch driving member 3 will be in its position nearest to the resisting member 11; or in other words the cam member and balls or rollers allow the clutch members 2 and 3 to remain separated or in open position for the clutch. When the member 3 reaches a sufficient speed of rotation the free ends of the pivoted weighted arms 5 will fly outwardly thus moving the cam member 8 relatively to the system of balls or rollers and also relatively to the driving member a sufficient distance to force the driving member into frictional engagement with the driven member of the clutch. When the clutch driving member 3 slows down the centrifugal force of the weighted arms becomes less effective thus allowing the arms assisted by the pulling effect of the springs to move the cam member relatively to the system of balls or rollers which engage the inclined surfaces of the cam member thereby obtaining a quick release or opening of the clutch.

It will thus be observed that the spacing ring constitutes a part of the brake closing and releasing mechanism of which the balls or rollers and cam member also constitute a part, as previously indicated. It will also be observed that this brake closing and releasing mechanism is operatively associated with the clutch driving member on the one hand and the resisting member on the other hand and that its operation is controlled by means, to wit, the centrifugal weighted pivoted arms that are carried by and rotated with the driving member 3. These arms are the members that actually control the position of the cam member.

I believe I am the first to employ balls or the like as an essential part of a closing and releasing mechanism of a clutch and especially where such balls or the like engage cam or wedge surfaces on a member or members that constitutes a part of such mechanism, and I desire to claim the same broadly. The driving member of the clutch has been referred to herein as a disk but it will be manifest that the mechanical equivalent would be realized in any suitable member, of whatever form, that is driven by a clutch driving member which is controlled through the medium of balls or any equivalent roller construction.

The improvements herein set forth are not limited to the precise construction and arrangement shown and described for they may be embodied in various forms and modifications without departing from the spirit and scope of the invention.

What I claim is:

1. A friction clutch of the class described comprising in combination a disk, a shaft carrying the same, a resisting member fixed relatively to said disk, a driving member between said disk and said resisting member, a clutch closing and releasing means between said driving member and said resisting member which means comprises balls that engage a member having inclined surfaces or wedged portions and means rotatable with the driving member constructed and arranged so that as the driving member reaches a certain speed there will be imparted a relative movement between the balls as a set and the member having inclined wedged surfaces whereby the driving member and disk will be forced toward each other so that the disk will be driven by the driving member, the balls as a set being held in place by a spacer which is carried by the driving member, said means that is rotatable with the driving member also being constructed and arranged so that when the driving member slows down a certain amount the member having the inclined surfaces will be moved relatively to the balls as a set whereby the driving member and the disk will be released.

2. A friction clutch of the class described comprising in combination a disk, a shaft carrying the same, a resisting member, a driving member between said disk and said resisting member, clutch closing and releasing means operatively associated with said driving member and said resisting member which means comprises balls that engage or are engaged by inclined surfaces or wedged portions of an annular member mounted upon said shaft, the annular member also being provided with teeth, and weighted arms pivotally mounted upon and rotatable with the driving member, said weighted arms having teeth that engage the teeth of the annular member whereby the weighted arms through the medium of said teeth will control the position of the annular member, the construction and arrangement being such that as the driving member reaches a certain speed there will be imparted a relative movement between the balls and the annular member whereby the driving member and disk will be forced toward each other so that the disk will be driven by the driving member, the construction and arrangement also being such that when the driving member slows down a certain amount the balls and the annular member will be moved relatively to each other whereby the driving member and the disk will be released.

3. A centrifugal clutch comprising in combination a disk, a shaft carrying the same, a resisting member fixed relatively to said disk, a driving member arranged so that it can forcibly engage the disk so as to rotate the latter, a movable cam member having inclined surfaces, balls engaging said surfaces, which member and balls are arranged between the driving member and the resisting member, and centrifugal means carried by the driving member and arranged to move the cam-shaped member relatively to the driving member.

4. A centrifugal clutch comprising in combination a disk, a resisting member fixed relatively to said disk, a driving member, a series of balls, a ball spacing-ring secured to said driving member, a cam member constructed so that the balls engage the cam surfaces thereupon, which cam member and balls are located between the driving member and the resisting member and are constructed and arranged so that when the cam member is in one position relative to the driving member the latter will be in engagement with the disk and so that when in another position the driving member will be out of driving engagement with said disk, and centrifugal means mounted on said driving member which centrifugal means controls the position of said cam member relative to the driving member.

5. A clutch of the class described comprising in combination a disk, a shaft to which said disk is secured, a resisting member fixed relatively to said disk, a driving gear or member arranged so that it can be forced against the disk whereby it will cause a rotation of the disk, balls in engagement with said resisting member, a member having cam surfaces in engagement with the driving member, and pivoted weighted arms carried on the driving member and operatively associated with said cam member so as to control the position of the cam member relative to the driving member.

6. A clutch of the class described comprising in combination a shaft driving disk, a driving member for driving said disk by frictional engagement therewith, a resisting member, a series of balls in engagement with said resisting member, a cam member between said balls and said driving member, which cam member is constructed so that when in one position relative to said driving member the latter will be in driving engagement with said disk and so that when in another position relative to said driving member the driving member will be out of driving engagement with said disk, and pivoted weighted members carried by said driving member which pivoted members are in operative engagement with said cam member whereby they will control the position of the cam member relative to the driving member, said balls being held in a proper position relative to the driving member by means of a spacing-ring which is secured to said driving member.

7. A clutch of the class described comprising in combination a disk, a shaft to which the disk is secured, a resisting member, a driving member between said disk and said resisting member, a series of balls held in place relative to said driving member, a cam member in engagement with said balls which cam member and balls are located between said driving member and said resisting member, and weighted arms carried by the driving member in operative engagement with said member to control the position of the cam member relative to said driving member, the construction of the cam member being such that when in one position relative to the driving member the latter will forcibly engage the disk whereby the driving member and disk will rotate together, the construction also being such that when the cam member is moved from said position it will release the driving engagement existing between the driving member and the disk.

8. A clutch of the class described comprising in combination a disk having a hub secured to a shaft, a resisting member carried on said hub, a driving member revolubly mounted upon said hub and located between said disk and said resisting member, a series of balls, a spacing-ring for said balls which ring is secured to and movable with said driving member, a cam member having cam surfaces which engage said balls, which cam member and balls are located between the resisting member and the driving member so as to provide means for closing and releasing the clutch, and weighted arms pivotally mounted upon said driving member and operatively engaging said cam member so as to move said cam member relative to said balls which are held in place by said spacing-ring.

This specification signed and witnessed this 8th day of February, A. D. 1916.

ALFRED M. SUTHER.

Signed in the presence of—
L. C. TROXELL,
EDWIN A. PACKARD.